United States Patent [19]

Kobayashi

[11] Patent Number: 4,966,542
[45] Date of Patent: Oct. 30, 1990

[54] APPARATUS FOR THE FORMATION OF A SHAPED FOOD PRODUCT

[76] Inventor: Masao Kobayashi, 413-2, Nittazuka, Fukui-shi, Fukui-ken, Japan

[21] Appl. No.: 390,736

[22] Filed: Aug. 8, 1989

[30] Foreign Application Priority Data

Aug. 12, 1988 [JP] Japan ................................ 63-202592

[51] Int. Cl.$^5$ .......................... A21C 3/04; A21C 11/10; A21G 3/12
[52] U.S. Cl. ...................................... 425/307; 425/308
[58] Field of Search ............... 425/308, 306, 307, 313, 425/316, 311; 83/356.3, 680, 672

[56] References Cited

U.S. PATENT DOCUMENTS

| | | | |
|---|---|---|---|
| 28,068 | 5/1860 | Edwards et al. | 83/680 |
| 1,909,029 | 5/1933 | Walter | 83/672 |
| 1,974,602 | 9/1934 | Dziedzik | 83/672 |
| 3,468,356 | 9/1969 | Brauns | 83/356.3 |
| 3,921,485 | 11/1975 | Tobey et al. | 83/672 |
| 3,969,966 | 7/1976 | Dillon | 83/672 |

FOREIGN PATENT DOCUMENTS 166715  11/1933  Switzerland .......................... 83/672

Primary Examiner—Willard Hoag
Attorney, Agent, or Firm—Staas & Halsey

[57] ABSTRACT

This invention discloses an apparatus for the formation of a shaped food product, and the apparatus adopts the helix disc cutters which make their self rotation and orbital revolution and according to the said rotating and revolving movement the passage is formed for opening and closing, wherein more than two kinds of food material are pushed from the extruder, and finally the desirable formation of a shaped food product is obtained after making the most of passage transformations caused by rotation and revolution of two pairs of helix disc cutters.

19 Claims, 9 Drawing Sheets

APPARATUS FOR THE FORMATION OF A SHAPED FOOD PRODUCT

BACKGROUND OF THE INVENTION

1. Field of the Invention

This invention relates to an improvement of an apparatus for forming soft food material into globular shape, and more particularly to a simplified apparatus for forming successively food material, extruded in columnar form, such as dough, soft rice cake, soft candy, ground meat, minced meat and mashed potato, into globular shape wherein some second food material is available to be put into the extruded column as a core. This invention benefits the confectionery industry or large scale food processing industry.

2. Description of the Related Art

The inventor pioneered a new mass production apparatus for such food, as described in U.S. Pat. No. 4,398,881, wherein a pair of crawler belt means (cut and roll up system by crawler belt) is used to complete a globularly shaped and wrapped food product. This apparatus has enjoyed a good reputation for its mass production capability throughout the confectionery and process food industry world.

The above mentioned apparatus, however, has such a high production rate that it has invited some inconvenience of overproduction for a small enterprise which cannot secure some big orders. As a result, it may become idle.

In order to overcome such a case, Japanese Publication No. 40-27293 disclosed an apparatus forming food material into the form of a column by movement of two piece cutters having cam shaped circumferential areas.

The invention disclosed by Japanese Publication No. 40-27293, however, adopted the simple and automatic cutting method by two cutters in the rotation movement of those relative cams, and thereby some inconvenient matters are unavoidable such as the scattering of the food material because of impact load and frictional force imposed on this cutting procedure and the clogging of the said material to the cutter itself and also the scratching of the completed food product during the cutting work.

In order to make a counter measure for the said inconveniences, the rotating speed of the food material supply should be equal to that of the said cam cutter relatively when the food material is extruded in the form of a column, whereby the satisfactory shape is obtainable. This method, however, damages greatly the nature of the food material because of forcible fluidic friction, wherefore it caused the deterioration of food taste and food quality.

SUMMARY OF THE INVENTION

In order to overcome the explained inconveniences as well as an overproduction by the cut and roll up system by the crawler belt means under U.S. Pat. No. 4,398,881, it is an object of the present invention to supply an apparatus for the formation of a shaped food product proper for a small enterprise without any overproduction in a smooth and successive manner.

This invention has another object to supply an apparatus for the formation of a shaped food product with a high and genuine quality as if it were made by subtle hands of reliable craftsman.

Another object is to supply an apparatus for the formation of a shaped food product in a simple mechanism and in a low cost operated by a small factory in the proper manner.

This invention discloses an apparatus for forming a globular food product in which food material in the form of column is wrapped with another food material and cut down smartly one by one in a smooth manner, and the said apparatus comprises:

(a) forming and cutting means having two pairs of variable radius cutters disposed at two steps, the upper and the lower sides, said disc cutters having blade portions circumferentially and radius of the said cutters expanding gradually along involute lines in resulting the said blade portions in acute angle edge, while after one cycle of circular motion the said radius reducing suddenly in resulting the said blade portions in dull angle edge, and the said two pairs of helix disc cutters disposed symmetrically and horizontally in order that each blade makes a frictional contact when each opposite disc cutter becomes a maximum diameter;

(b) self-rotation and orbital revolution means of the said disc cutters adapted to rotate each opposite disc cutter in the reverse directions while a whole body of these disc cutters is adapted to revolve orbitally in the same direction constantly, and when each helix disc cutter rotates the passage is opened or closed in the center areas of orbital revolution movement;

(c) extruder means adapted to extrude food material in the form of a column successively into the passage from the upside, the said passage formed by the expansion or reduction of the said disc cutter radius size caused by the rotation of each disc cutter.

The other objects of the present invention will become more apparent by the following descriptions.

BRIEF DESCRIPTION OF THE DRAWINGS

FIG. 6 is a plan view of a cutter in the situation immediately after the first food material is cut down and separated.

FIG. 14 is a cross-sectional view taken from the line F—F of FIG. 12.

DETAILED DESCRIPTIONS OF THE PREFERRED EMBODIMENT

Figure 1:
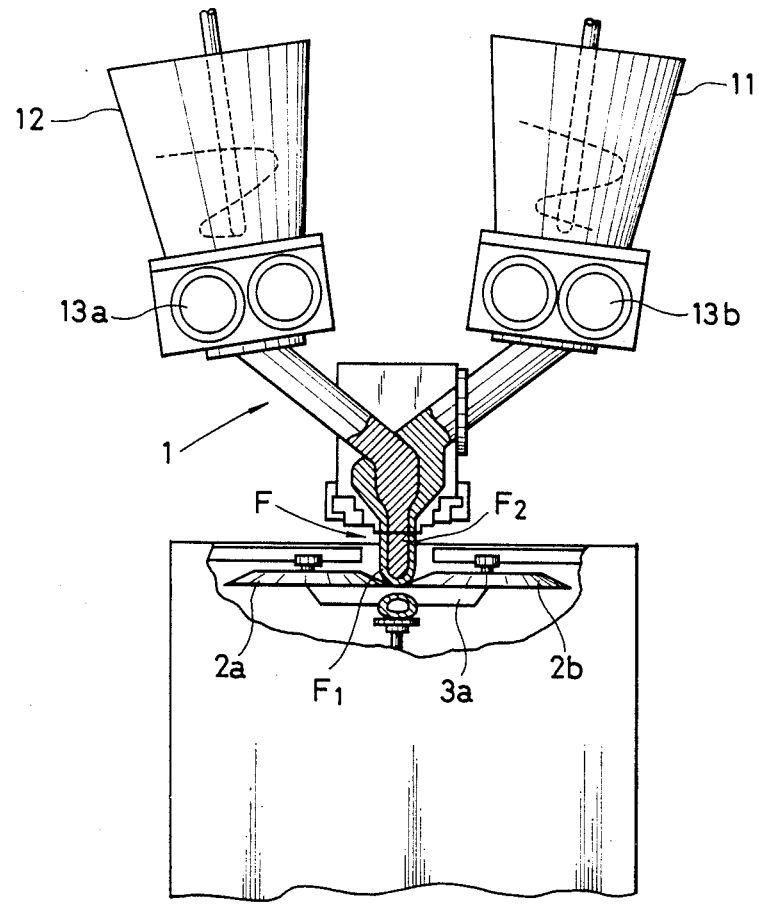
FIG. 1 is a diagrammatic elevational view of an apparatus in its entirety for forming a shaped food product according to the present invention.

Referring to FIG. 1, an extruder 1 pushes out food material (F) in the form of a column, after first food material (F1) is delivered from first hopper (11) and second food material (F2) is delivered from second hopper (12) via gear pumps (13a and 13b), whereupon said material F2 is contained in the said material F1 which is destined to be formed into globular shape. This extruder is substantially similar to the one disclosed in U.S. Pat. No. 4,398,881 by the present inventor, and is therefore generally known.

Figure 2:
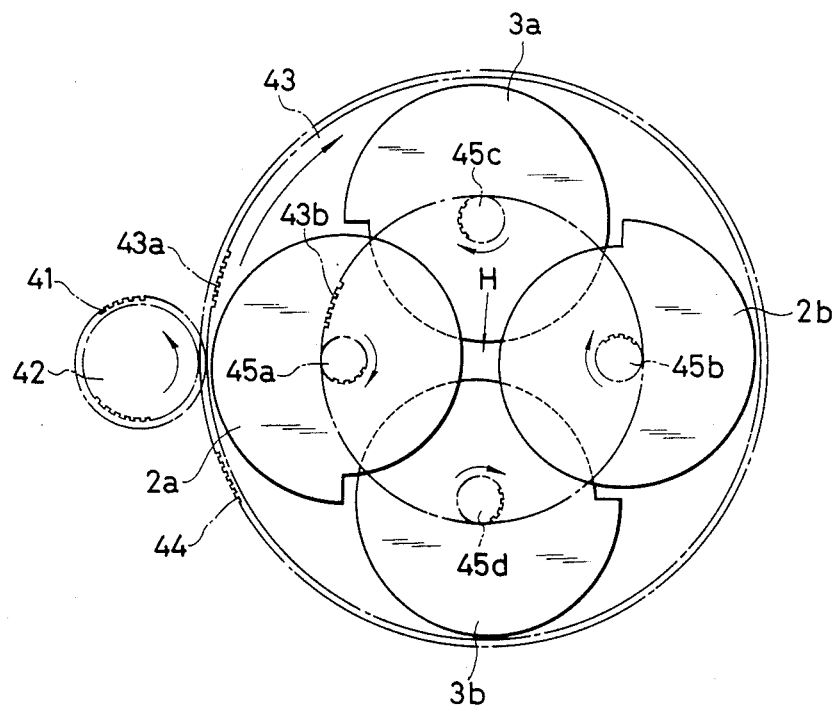
FIG. 2 is a partially cutaway view showing the mechanism of a gear movement operated by the motor mechanism of a disc cutter.
Figure 3:
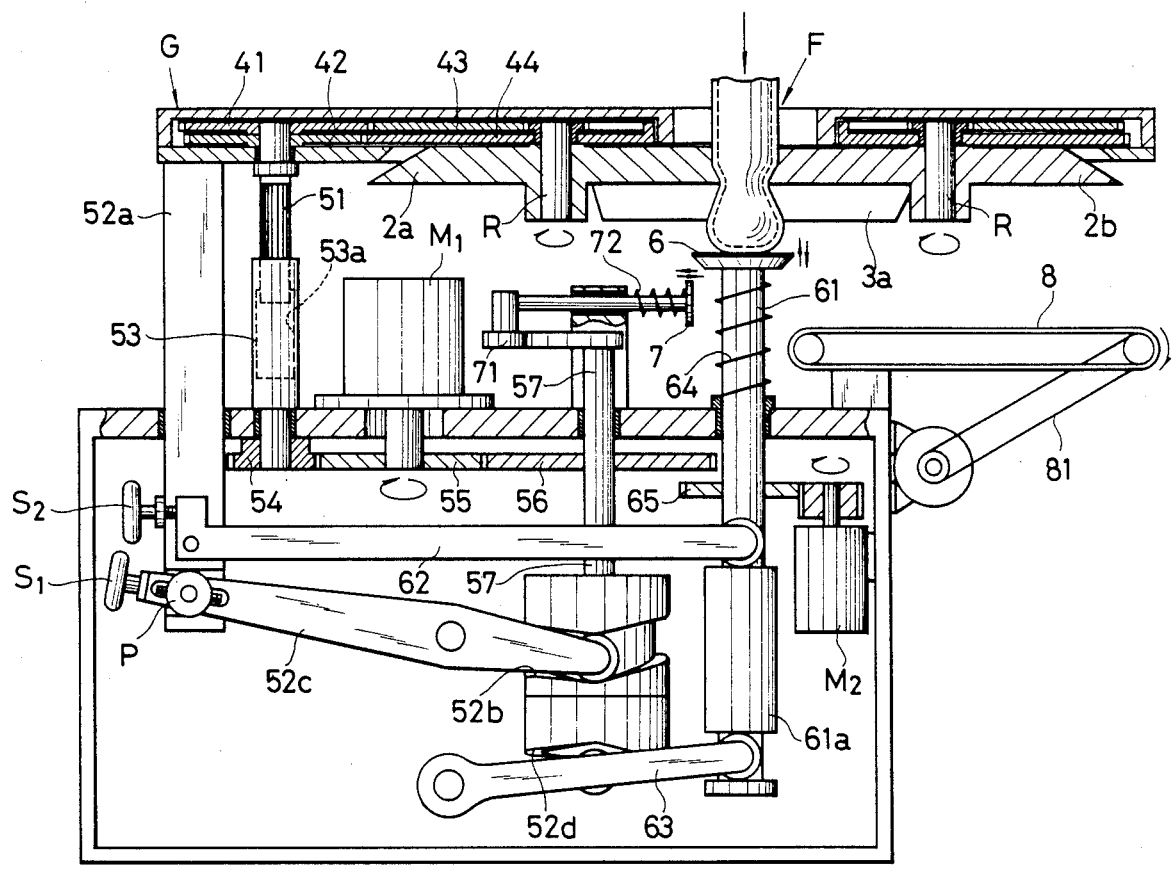
FIG. 3 is a partially sectional elevational view of the actual element embodiment.
Figure 4:
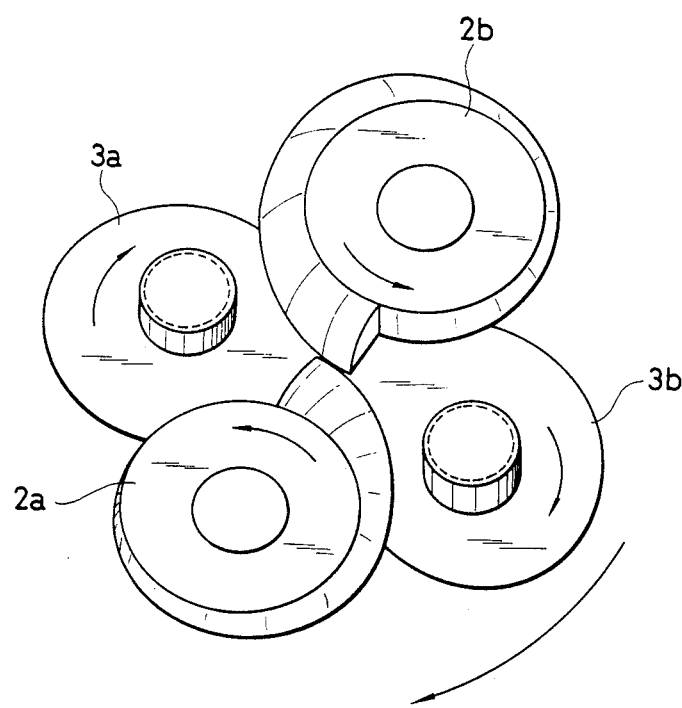
FIG. 4 and FIG. 5 are perspective views showing that the shape of a cutter and rotation/revolution of the same.
Figure 5:
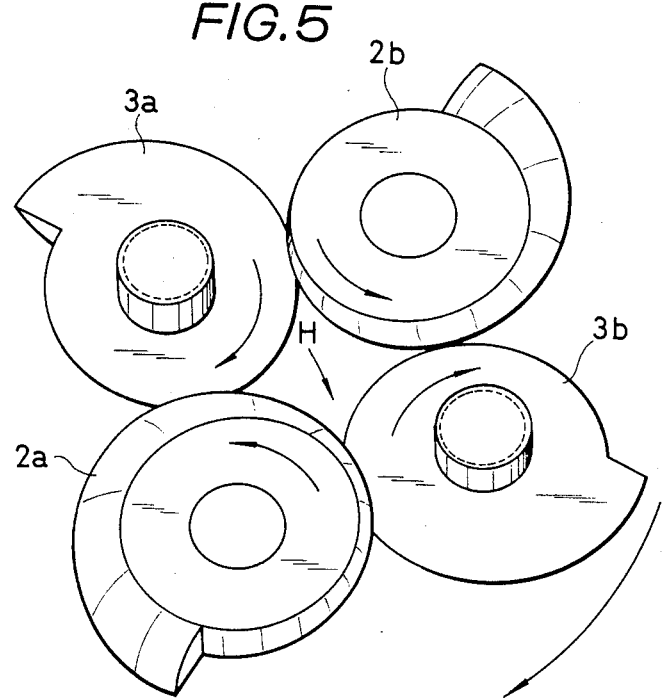

The numerals 2a, 2b and the numerals 3a, 3b denote variable radius cutters with two steps having blade portions on the circumferential areas, each cutter having a gradually increasingly radius along an involute line causing the said blade portions to have an increasingly acute angle edge with increasing radial length, while after one cycle movement of circular motion the said blade portions become obtuse in angle edge by reducing radius suddenly. Each pair of cutters, 2a, 2b and 3a, 3b, must rotate in the reverse directions, and therefore, each surrounding configuration of 2a, 2b and 3a, 3b is adapted to be made symmetrically. As shown in FIG. 2, FIG. 4, and FIG. 5, each said cutter, 2a, 2b and 3a, 3b, rotates itself in the upper and lower sides while a whole body of the said cutters revolves in the same direction. In order to ensure the movement of the cutters (2a, 2b, 3a, 3b) for self rotation and total revolution, this invention adopts the so-called planetary gear drive mechanism as shown in FIG. 2 and FIG. 3. In FIG. 1 and FIG. 3, for clear understanding and observation some helix disc cutters are omitted from the drawings.

The cutters (2a, 2b, 3a, 3b) are rotated by a planetary gear drive mechanism built inside of the flat plate designated gear box (G).

The planetary gear drive mechanism includes a pair of large pinion (41) and a small pinion (42) rotated by a splined shaft (51), a sun gear (43) having an outer gear portion (43a) meshing with the large pinion (41) and an inner gear portion (43b), and an orbital motion gear (44) meshing with the small pinion (42) rotating slightly faster than the sun gear (43) due to the rotation of the smaller pinion (42).

Planetary gears (45a, 45b, 45c, 45d) are fixed to rotate with rotatable shafts R disposed at equal angle on the exactly same circumferential movement against the said orbital motion gear (44) in the rotatable condition. The planetary gears (45a, 45b, 45c, 45d) are destined to rotate itself connecting with the inner gear portion (43b) of the sun gear (43). When each of the said planetary gears (45a, 45b, 45c, 45d) starts its rotation and orbital revolution, cutters (2a, 2b, 3a, 3b) fixed below the said cutter rotation shafts (R) opens or closes a passage portion (H) in the center area of orbital revolution movement in accordance with the diametric changes of the Just below gear box (G) of the said planetary gear drive mechanism, a lifting rod (52a) is disposed for moving the gear box (G) up and down in the horizontal direction by the operation of a lever (52c) acting in cooperation with a rotatable cam (52b). The splined shaft (51), which rotates the two pinions (41, 42) is freely slidable in the axial direction into a splined cylinder hole (53a) formed in a drive shaft (53). Gear 54 is connected to the bottom end of the drive shaft (53), the gear (54) being connected with motor gear (55) driven by the first motor (M1).

In other words, the rotation and orbital revolution movement of the cutters (2a, 2b, 3a, 3b) are caused by the following movements in turn: operation of first motor (M1) transmits its power to motor gear (55) first, splined cylinder hole (53a) of driving axis (53) secondly, and splined shaft (51) finally, while elevational movement is given to cam (52b), lever (52c) and lifting rod (52a) in turn, whereon the splined shaft slides vertically in the inside of the splined cylinder hole (53a). The rotation of cam (52b) synchronizes with the planetary gear drive mechanism by the rotation of cam shaft (57) via subordinate gear (56) meshing with motor gear (55) of the first motor (M1).

The numeral 6 designates an elevational receiver, which accepts globular food material formed by the rotation and orbital revolution of the said cutters (2a, 2b, 3a, 3b) in good timing for synchronizing with elevational movement. The elevational receiver (6) having a receiver rod (61) in its underneath which connects with the said lifting rod (52a) via linkage (62) moves synchronously in accordance with lifting rod (52a). In the example of this embodiment, a forcing rod (61a) is formed at the bottom end of the receiver rod (61). The bottom end of the said forcing rod (61a) is operated by an oscillating lever (63) pivoted by cam (52d) via cam shaft (57) which receives the transmissional power of the said first motor (M1), whereas the receiver rod (61) is pushed downwardly further by the linkage (62). The numeral 64 denotes a spring for restoration movement, while the numeral 65 indicates a rod rotating gear fixed on the circumference of the receiver rod (61) and it rotates the elevational receiver (6) at a fixed speed determined by the r.p.m.'s of a second motor (M2).

The numeral 7 denotes a pushing rod which works to push up the elevational receiver (6) when it comes down by the rotating movement of a cam (71) formed on the upper end of the cam shaft (57) through the transmissional power of the first motor (M1). The numeral 72 indicates a spring which helps to restore the pushing rod (7) to the original place.

The numeral 8 denotes a conveyor which relays globular food material pushed down from the elevational receiver (6) to a required place. This conveyor (8) is driven by the second motor (M2) via belt pulley (81).

The elevational stroke values of the elevating rod (52a) and gear box (G) can be regulated by turning a regulating screw (S1) on the working point (P) of the lever (52c), while another regulating screw (S2) formed on the elevating rod (52a) effects angular changes between the elevating rod (52a) and the linkage (62) and also between the linkage (62) and the receiver rod (61), wherefore the distance between the elevational receiver (6) and the cutters (2a, 2b, 3a, 3b) are correctly adjusted.

Figure 15:
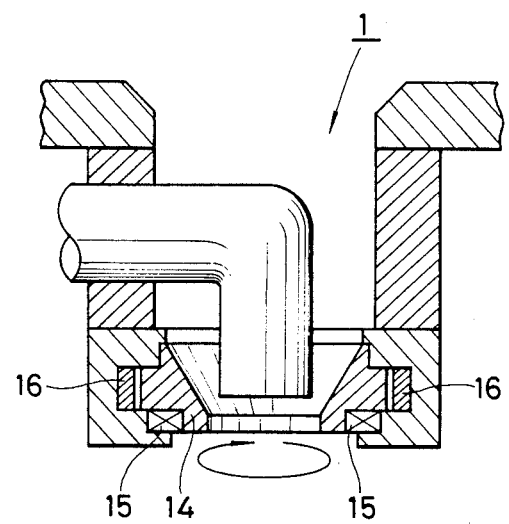
FIG. 15 is a partially sectional elevational view of a different embodiment showing a revolving mouthpiece of pushing out gate equipped with an extruder.
Figure 16:
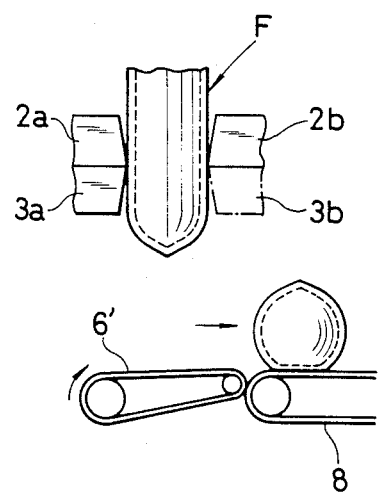
FIG. 16 through FIG. 19 are partially cutaway views showing the movement of an elevating conveyor as a different example of an elevational receiver.
Figure 17:
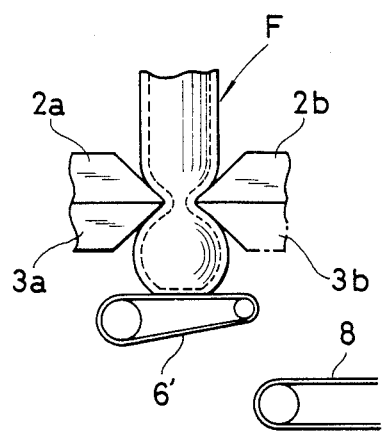
Figure 18:
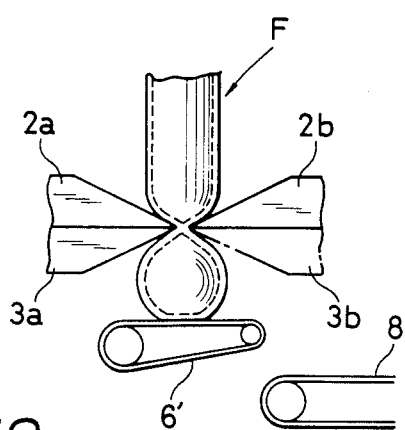
Figure 19:
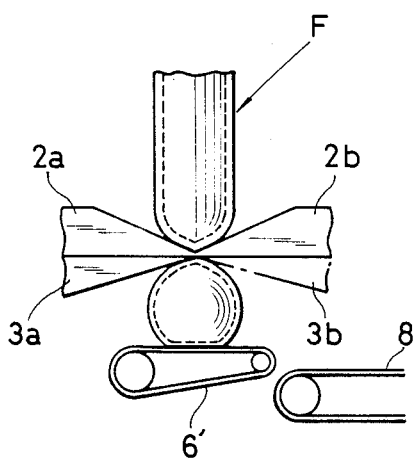

While a certain embodiment of the present invention is shown an described, it is to be described, it is to be distinctly understood that the present invention is not limited thereto but may be otherwise modified within the scope of the appended claims. For example, as shown in FIG. 15, a mouthpiece (14) is formed around the mouth of pushing out gate on the extruder (1) and is disposed on a bearing (15), whereafter it is rotated nearly at the same speed of orbital revolution caused by the cutters (2a, 2b, 3b) by a timing belt (16) so that the frictional force or influence by centrifugal force on food material (F) is largely eliminated. For another example, as shown in FIG. 16 through FIG. 19, an elevating conveyor (6') is adopted, whereas globular food material is carried out quite smoothly.

Now, with reference to FIG. 6 through FIG. 14, operation of the preferred embodiment is explained.

This embodiment produces "ANHABUTAE", Japanese soft rice cake wrapping white beam jam. In other words, soft rice cake is used as wrapping food material (F1) while white beam jam is used as inside core food material (F2) accordingly.

Figure 6:
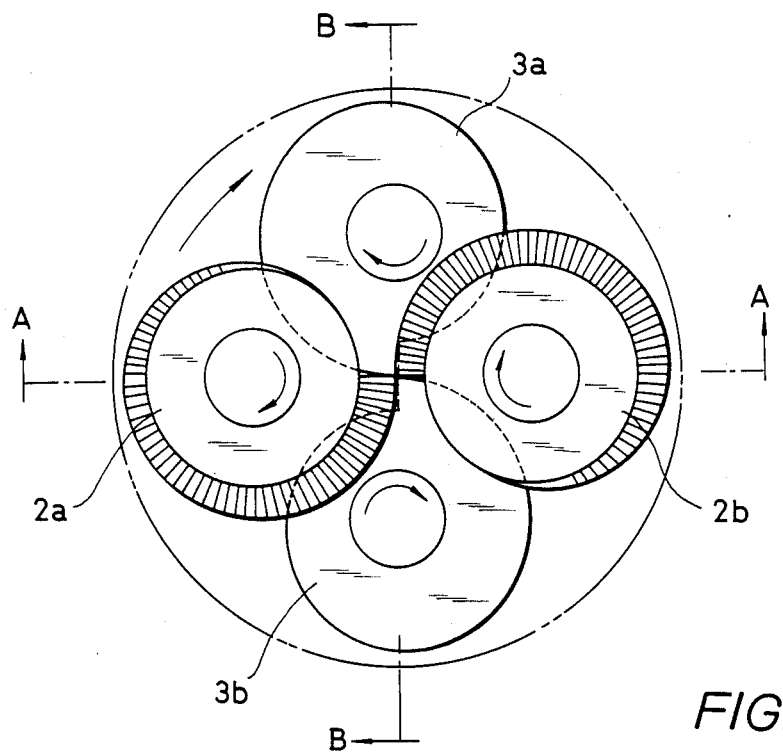
FIG. 6 and FIG. 14 are explanatory views showing the production process of "ANHABUTAE" product according to the actual embodiment, as follows.
Figure 7:
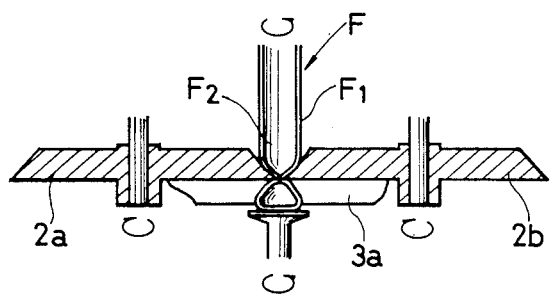
FIG. 7 is a cross-sectional view taken from the line A—A of FIG. 6.
Figure 8:
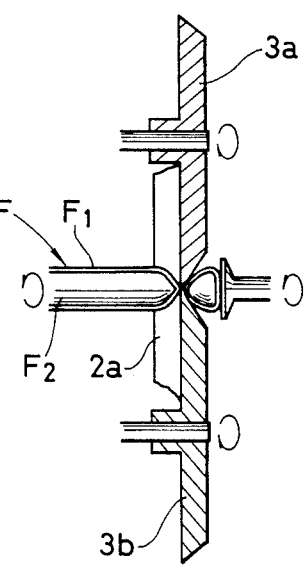

FIG. 6 through FIG. 8 show the situations just after the first completion of "ANHABUTAE" and then a passage (H) is closed completely. When this first product is complete, the second product is waiting on the passage (H) in the following conditions:

(a) inside core food material (F2) is wrapped and sealed by wrapping food material (F1) by the movement of the cutters (2a, 2b, 3a, 3b);

(b) two pairs of cutter blade portions in the upper and lower sides become opposite and contact each other in an acute angle.

The above situations can be seen in FIG. 7.

Figure 9:
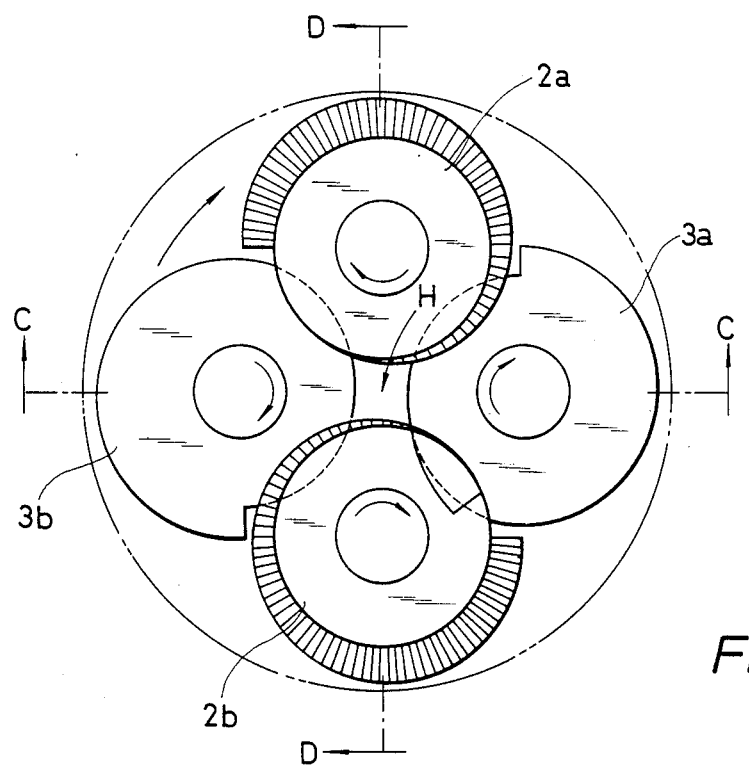
FIG. 9 is a plan view of a cutter showing the formation of passage portions wherein food material passes.
Figure 11:
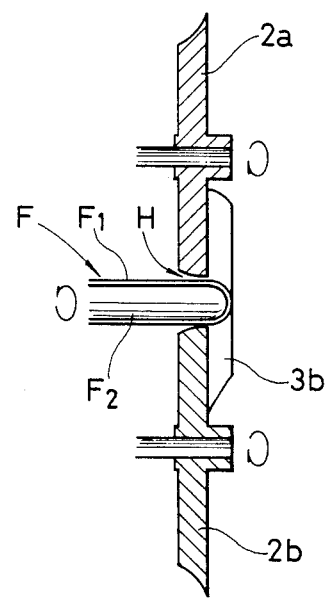
FIG. 11 is a cross-sectional view taken from the line D—D of FIG. 9.
Figure 10:
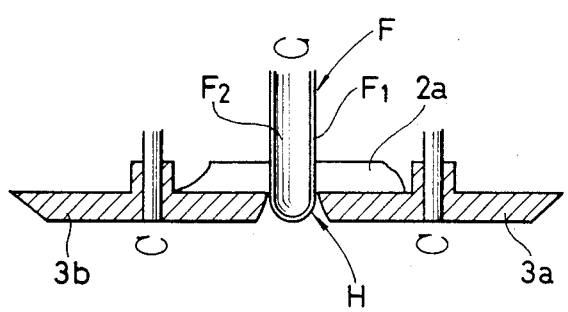
FIG. 10 is a cross-sectional view taken from the line C—C of FIG. 9.

When the cutters (2a, 2b, 3a, 3b) proceed to rotate and orbit as shown in FIG. 9 through FIG. 11, each cutter starts to reduce its radius and the cutter blade portions become obtuse in angle, whereon the passage (H) opens and the food material comes therein from the extruder (1).

Figure 12:
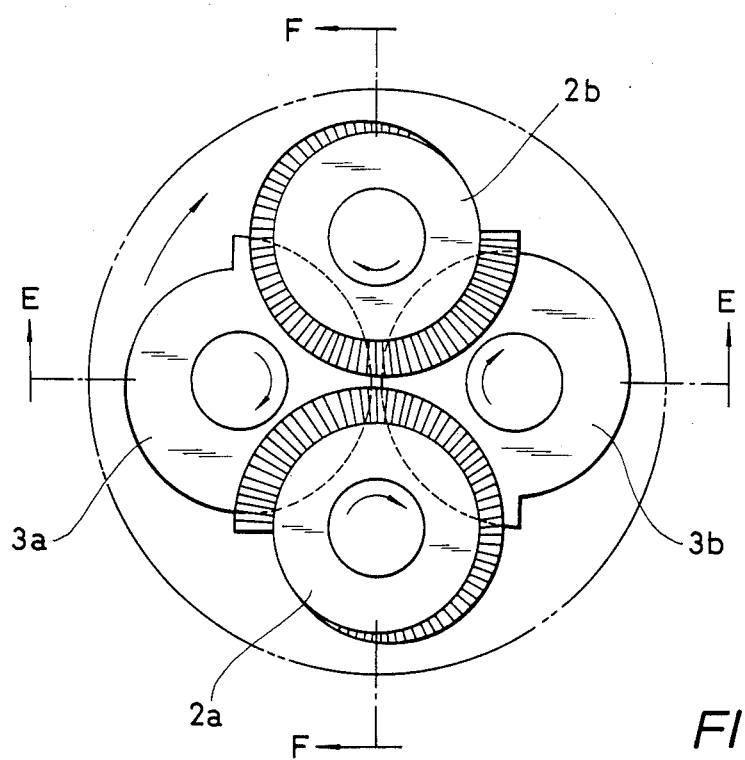
FIG. 12 is a plan view of a cutter showing the very instant to cut down food material by narrowing the diameter of the passage portions.
Figure 13:
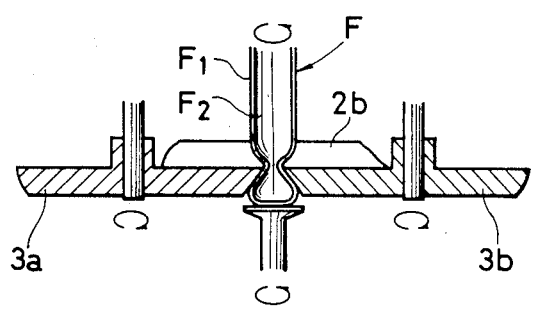
FIG. 13 is a cross-sectional view taken from the line E—E of FIG. 12.
Figure 14:
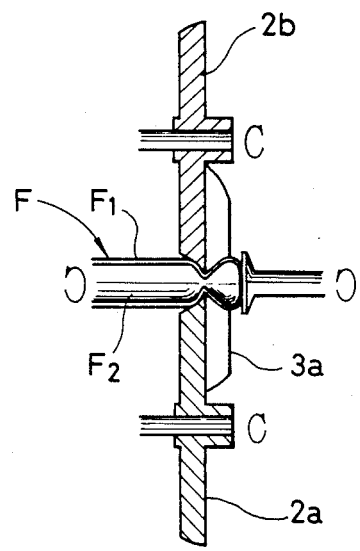

Then, as shown in FIG. 12 through FIG. 14, with further rotation and orbiting, the cutters (2a, 2b, 3a, 3b) orient themselves again so that their blade portions are at acute angles, where the diameter of the passage (H) becomes smaller and the cutters (2a, 2b, 3a, 3b) cut down the food material (F) gradually by squeezing method. In this procedure, the wrapping food material (F1) is wrapping the inside core food material (F2) completely.

While the cutters (2a, 2b, 3a, 3b) finish their cyclic movement, the situations return to the exactly same condition as shown in FIG. 6 through FIG. 8, the second product of "ANHABUTAE" is completed in the smart and perfect style.

The said cycle movement is repeated continuously whereon globular food product wrapped and sealed with two different food materials is obtainable.

So far, the preferred embodiment of this invention has been explained, and it adopts two pairs of cutters disposed at the opposite position and in the two stepped conditions, upper and lower sides respectively. Each cutter rotates itself while a whole body of these cutters revolves orbitally, wherein the said orbital revolution can control the speed of the movement of the said cutters properly operated by their self rotation. Therefore, production loss such as scatter of cut out food material by centrifugal force is correctly avoided.

Moreover, the two pairs of cutters properly open or close the passage in the center areas of the orbital revolution movement in good timing, whereon the proper cutting of food material is performed smoothly just before coming into the passage. Even if the cutters make their self rotation and orbital revolution at high speed, it does not cause any scatter of food material at all, and therefore high speed production is also available by this invention.

As described so far, this invention realizes an apparatus for the formation of a shaped food product in fine and high grades in the constant manner effectively.

What is claimed is:

1. An apparatus for the formation of a shaped food product comprising:

(a) forming and cutting means having two pairs of variable radius cutters disposed at two steps corresponding to an upper and a lower side, each cutter having a blade portion circumferentially thereon and formed having a radius regularly increasing through 360° of arc about a central axis of the cutter and then abruptly decreasing thus forming an acute angle edge, and the said two pairs of cutters being disposed symmetrically and horizontally so that each blade makes frictional contact with an opposite cutter at a point of maximum radius;

(b) self rotation and orbital revolution means of the said cutters for rotating each opposite cutter about an axis in a reverse direction while the cutters collectively revolve orbitally about an orbit axis in the same direction constantly, wherein a passage is formed between the cutters which is opened and closed with rotation and orbiting of the cutters;

(c) extruder means adapted to extrude food material in the form of a column successively into the passage from an upper side, the passage being formed by the expansion or reduction of the said cutter radius size measured from the orbit axis to the rotation axes of the cutters caused by the rotation of each cutter.

2. An apparatus for the formation of a shaped food product as claimed in claim 1 further comprising an elevating conveyor disposed below the passage for accepting the completed food material and removing said completed food material to a required place.

3. An apparatus for the formation of a shaped food product as claimed in claim 1 wherein the extruder means includes a mouth having a rotatable mouthpiece mounted in the mouth of the extruder means, said mouthpiece being rotatably driven by a timing belt to decrease frictional contact between the completed food material and the cutters.

4. An apparatus for the formation of a shaped food product as claimed in claim 1, wherein the forming and cutting means by cutters under the cooperative work of self rotation and orbital revolution cuts and forms food material into the form of column at the required size, the said food material being supplied by extruder means for repeating cycles of food forming.

5. An apparatus for the formation of a shaped food product as claimed in claim 2 further comprising an elevational receiver disposed under the passage and being commonly driven with said cutters, and accepting the completed food material.

6. An apparatus for the formation of a shaped food product as claimed in claim 2, further comprising an elevating conveyor disposed below the passage for accepting the completed food material and removing said completed food material to a required place.

7. An apparatus for the formation of a shaped food product as claimed in claim 2 wherein the extruder means includes a mouth having a rotatable mouthpiece mounted in the mouth of the extruder means, said mouthpiece being rotatably driven by a timing belt to decrease frictional contact between the completed food material and the cutters.

8. An apparatus for the formation of a shaped food product as claimed in claim 1, further comprising an elevational receiver disposed under the passage and being commonly driven with said cutters, and accepting the completed food material.

9. An apparatus for the formation of a shaped food product as claimed in claim 3 wherein the extruder means includes a mouth having a rotatable mouthpiece mounted in the mouth of the extruder means, said mouthpiece being rotatably driven by a timing belt to decrease frictional contact between the completed food material and the cutters.

10. An apparatus for the formation of a shaped food product as claimed in claim 3, further comprising pushing means driven by the self rotating and orbital revolution means for carrying the completed food material on the said receiver onto the conveyer.

11. An apparatus for the formation of a shaped food product as claimed in claim 4 wherein the extruder means includes a mouth having a rotatable mouthpiece mounted in the mouth of the extruder means, said mouthpiece being rotatably driven by a timing belt to decrease frictional contact between the completed food material and the cutters.

12. An apparatus for the formation of a shaped food product as claimed in claim 4 wherein the extruder means includes a mouth having a rotatable mouthpiece mounted in the mouth of the extruder means, said mouthpiece being rotatably driven by a timing belt to decrease frictional contact between the completed food material and the cutters.

13. An apparatus for forming extruded food product into globular shapes, comprising:
a plurality of variable radius cutters arranged in opposing pairs, each cutter being rotatable about a rotation axis and having a cutting blade portion formed circumferentially with a constantly increasing radius, the plurality of cutters being movable orbitally around an orbital axis, the cutting blades of each opposing pair of cutters meeting when the radial length of the opposing pair of cutters reaches a maximum value, and a passage centered on the orbital axis being formed between the opposing pairs of cutters which increases in width as the radial length decreases,
means for rotating and orbiting the plurality of cutters; and
means for extruding food material in columnar form into the passage from above, globular shaped food products being formed by repeated opening and closing of the passage during extrusion.

14. An apparatus according to claim 13, wherein the plurality of cutters includes two pairs of opposing cutters arranged symmetrically around the orbital axis.

15. An apparatus according to claim 14, wherein the cutting blade of each cutter becomes more acute with increasing radius.

16. An apparatus according to claim 15, wherein the cutters of one pair rotate in a direction opposite that of the cutters of the other pair.

17. An apparatus according to claim 16, wherein the rotating means comprises a planetary gear drive which includes a sun gear driven by a drive motor to orbit the plurality of cutters, and a plurality of planetary gears corresponding respectively to the plurality of cutters, for rotating the cutters simultaneously with the orbital movement thereof.

18. An apparatus according to claim 17, further comprising and elevational receiver disposed beneath the passageway for receiving the globular shaped food products.

19. An apparatus according to claim 18, further comprising cam means, coupled to the planetary drive, for reciprocating the elevational receiver towards and away from the passageway.

* * * * *

UNITED STATES PATENT AND TRADEMARK OFFICE
CERTIFICATE OF CORRECTION

PATENT NO. : 4,966,542
DATED : October 30, 1990
INVENTOR(S) : Kobayashi

It is certified that error appears in the above-identified patent and that said Letters Patent is hereby corrected as shown below:

Title Page, Under "ABSTRACT" - please delete existing Abstract and substitute the following as requested in the April 24, 1990 Amendment:

--The invention discloses an apparatus for the formation of a shaped food product, using variable radius cutters which rotate individually and orbit collectively. According to the rotating and orbiting movement, a passage is formed for opening and closing, wherein more than two kinds of food material are pushed from the extruder. Finally, the desirable formation of a shaped food product is obtained after making the most of passage transformations caused by rotation and orbiting the two pairs of cutters.--

Col. 2, line 10, delete "disc";
line 16, delete "helix disc";
line 21, delete "disc" (both occurrences);
line 23, delete "disc";
line 24, delete "helix disc";
line 30, delete "disc";

UNITED STATES PATENT AND TRADEMARK OFFICE
CERTIFICATE OF CORRECTION

PATENT NO. : 4,966,542

DATED : October 30, 1990

INVENTOR(S) : Kobayashi

It is certified that error appears in the above-identified patent and that said Letters Patent is hereby corrected as shown below:

Col. 2, line 31, delete "disc";

Signed and Sealed this

Ninth Day of June, 1992

Attest:

DOUGLAS B. COMER

*Attesting Officer*  *Acting Commissioner of Patents and Trademarks*